US006987763B2

(12) United States Patent
Rochberger et al.

(10) Patent No.: US 6,987,763 B2
(45) Date of Patent: Jan. 17, 2006

(54) LOAD BALANCING

(75) Inventors: Haim Rochberger, Telmond (IL); Yoram Mizrachi, Tel Aviv (IL)

(73) Assignee: Comverse Ltd., Tel Aviv (IL)

( * ) Notice: Subject to any disclaimer, the term of this patent is extended or adjusted under 35 U.S.C. 154(b) by 894 days.

(21) Appl. No.: 09/848,335

(22) Filed: May 4, 2001

(65) Prior Publication Data

US 2002/0012319 A1 Jan. 31, 2002

Related U.S. Application Data

(60) Provisional application No. 60/201,728, filed on May 4, 2000.

(51) Int. Cl.
*H04L 12/28* (2006.01)

(52) U.S. Cl. ........................................ 370/389; 370/392

(58) Field of Classification Search ................. 370/229, 370/389, 392, 252, 253, 232, 233, 234, 235; 709/203, 223, 224, 225, 226, 227
See application file for complete search history.

(56) References Cited

U.S. PATENT DOCUMENTS 5,774,660 A 6/1998 Brendel et al.
6,128,279 A * 10/2000 O'Neil et al. ............... 370/229
6,128,644 A * 10/2000 Nozaki ........................ 709/203
6,578,066 B1 * 6/2003 Logan et al. ............... 718/105
6,598,088 B1 * 7/2003 Lynch et al. ................ 709/238
6,625,650 B2 * 9/2003 Stelliga ...................... 709/226
6,671,259 B1 * 12/2003 He et al. ..................... 370/238
6,687,222 B1 * 2/2004 Albert et al. ............... 370/230
6,704,278 B1 * 3/2004 Albert et al. ............... 370/216
6,735,169 B1 * 5/2004 Albert et al. ............... 370/229
6,745,243 B2 * 6/2004 Squire et al. ............... 709/227
6,748,437 B1 * 6/2004 Modi et al. ................. 709/227
6,779,017 B1 * 8/2004 Lamberton et al. ......... 709/203
6,888,797 B1 * 5/2005 Cao et al. ................... 370/235

* cited by examiner

*Primary Examiner*—Hanh Nguyen
*Assistant Examiner*—Hong Sol Cho
(74) *Attorney, Agent, or Firm*—Sughrue Mion, PLLC

(57) ABSTRACT

A system, computer program product and method for distributing incoming packets among several servers or other network devices, such as routers or proxies. The distribution is based on calculations, which include data associated with each of the packets. The data is selected to be invariant from packet to packet within a session. The system and method preferably operate independently from the servers or other devices, and therefore do not require feedback from the servers, and do not require the maintenance of a session table.

42 Claims, 4 Drawing Sheets

LOAD BALANCING

The application claims the benefit of U.S. Provisional Patent Application No. 60/201,728, filed May, 4, 2000, entitled "Statistical Load Balancing", the disclosure of which is incorporated by reference in its entirety.

FIELD OF THE INVENTION

The present invention is directed to a method, a system and a computer program product for statistical load balancing or distributing of several computer servers or other devices that receive or forward packets, such as routers and proxies, and in particular, to such a system, method and computer program product for load balancing, which enables the load to be distributed among the several servers or other devices, optionally even if feedback is not received from the servers.

BACKGROUND OF THE INVENTION

Networks of computers are important for the transmission of data, both on a local basis, such as a LAN (local area network) for example, and on a global basis, such as the Internet. A network may have several servers, for providing data to client computers through the client-server model of data transmissions. In order to evenly distribute the load among these different servers, a load balancer is often employed. One example of such a load balancer is described in U.S. Pat. No. 5,774,660 which is incorporated herein by reference. The load balancer is a server which distributes the load by determining which server should receive a particular data transmission. The goal of the load balancer is to ensure that the most efficient distribution is maintained, in order to prevent a situation, for example, in which one server is idle while another server is suffering from degraded performance because of an excessive load.

One difficulty with maintaining an even balance between these different servers is that once a session has begun between a client and a particular server, the session must be continued with that server. The load balancer therefore maintains a session table, or a list of the sessions in which each server is currently engaged, in order for these sessions to be maintained with that particular server, even if that server currently has a higher load than other servers.

Referring now to FIG. 1, which shows a system 10 known in the art for distributing a load across several servers 12. Each server 12 is in communication with a load balancer 14, which is a computer server for receiving a number of user requests 16 from different clients across a network 18. As shown in FIG. 1, load balancer 14 selects a particular server 12 which has a relatively light load, and is labeled "free". The remaining servers 12 are labeled "busy", to indicate that these servers 12 are less able to receive the load. The load balancer 14 then causes the "free" server 12 to receive the user request, such that a new session is now added to the load on that particular server 12.

The load balancer 14 shown in FIG. 1 maintains a session table, in order to determine which sessions must be continued with a particular server 12, as well as to determine the current load on each server 12. The load balancer 14 must also use the determination of the current load on each server 12 in order to assign new sessions, and therefore feedback is required from each of the servers 12, as shown in FIG. 1. Clearly, the known system 10 shown in FIG. 1 has many drawbacks.

Many different rules and algorithms have been developed in order to facilitate the even distribution of the load by the load balancer. Examples of these rules and algorithms include determining load according to server responsiveness and/or total workload; and the use of a "round robin" distribution system, such that each new session is systematically assigned to a server, for example according to a predetermined order.

Unfortunately, all of these rules and algorithms have a number of drawbacks. First, the load balancer must maintain a session table. Second, feedback must be received by the load balancer from the server, both in order to determine the current load on that server and in order for the load balancer to maintain the session table. Third, each of these rules and algorithms is, in some sense, reactive to the current conditions of data transmission and data load. It is an object of the present invention to solve these and other disadvantages attendant with known load balancers.

There is therefore a need for, and it would be useful to have, a system and a method for load balancing among several servers on a network, in which feedback from the servers would optionally not be required, and in which the distributing of the load would not be dictated by the currently existing load conditions.

SUMMARY OF THE INVENTION

The present invention is of a system, computer program product and method for load balancing, based upon a calculation of a suitable distribution of the load among several servers or other devices that receive or forward packets. The present invention preferably does not require feedback from the servers. Also preferably, the present invention does not require the maintenance of a session table, such that the different sessions between the servers and clients do not need to be determined for the operation of the present invention.

According to the present invention, there is provided a system for load balancing packets received from a network. The system includes: (a) servers for receiving the packets, the plurality of servers being in communication with the network; and (b) a load balancer for selecting a particular server for receiving a particular packet according to a calculation. Preferably, the calculation is determined such that each packet from a particular session is sent to the same server. More preferably, the load balancer does not receive feedback from the servers. Most preferably, the load balancer does not maintain a session table.

According to a preferred embodiment of the present invention, the calculation is performed according to the following formula:

((SRC_IP_ADDR+DEST_IP_ADDR+DEST_PORT) % N)

wherein SRC_IP_ADDR is the source IP address of the packet; DEST_IP_ADDR is the destination IP address of the packet; DEST_PORT is the port of the destination of the packet; % represents a modulo operation; and N is the number of redundant servers.

In another embodiment, the load balancer is eliminated, and instead each of the servers receives the same packet, and each of the servers runs a program for performing the calculation according to the formula discussed above in order to identify the one server that is to handle the packet. The servers that are not identified to handle the packet simply discard the packet, such that only that one identified server (identified according to the formula result) handles the received packet.

According to another embodiment of the present invention, there is provided a method performed by a data processor for determining a load balance to several servers. The method includes: (a) receiving a packet; (b) determining a source IP address of the packet, a destination IP address of the packet and a port of the destination of the packet; (c) calculating a formula: ((SRC_IP_ADDR+DEST_IP_ADDR+DEST_PORT) % N) wherein SRC_IP_ADDR is the source IP address of the packet; DEST_IP_ADDR is the destination IP address of the packet; DEST_PORT is the port of the destination of the packet; % is a modulo operation; and N is the number of redundant servers; and (d) sending the packet to a particular server according to the calculation.

According to yet another embodiment of the invention, there is provided a computer program product carrying instructions for performing the following predetermined operations:

(a) receiving a packet;

(b) determining a source IP address of the packet, a destination IP address of the packet and a port of the destination of the packet;

(c) calculating a formula: ((SRC_IP_ADDR+DEST_IP_ADDR+DEST_PORT) % N) wherein SRC_IP_ADDR is the source IP address of the packet; DEST_IP_ADDR is the destination IP address of the packet; DEST_PORT is the port of the destination of the packet; % is a modulo operation; and N is the number of redundant servers; and (d) sending the packet to a particular server according to the calculation.

In another embodiment, the formula is used to distribute the load among several routers or proxies. In this embodiment, each of the several routers/proxies receives the same packet, and performs the calculation according to the formula for distributing the load among the several routers/proxies. Depending on th calculation result, one of the routers/proxies is identified as the router/proxy that is to handle the packet. Each of the remaining routers/proxies discards the received packet so that only the one identified router/proxy forwards the packet. In this way, the load among the several routers/proxies is distributed in a similar way that the load among the several servers is distributed. This embodiment for distributing the load among several routers/proxies may be used in connection with the previously-discussed embodiments such that the load along the routers/proxies as well as the load among the several servers are distributed.

In another embodiment, a different formula is used to distribute the load. This formula is as follows:

((SRC_IP_ADDR+SCR_POR+DEST_IP_ADDR+DEST_PORT+PROTOCOL) % N)

wherein SRC_IP_ADDR is the source IP address of the packet; DEST_IP_ADDR is the destination IP address of the packet; DEST_PORT is the port of the destination of the packet; SRC_PORT is the source port number, PROTOCOL is the protocol number, % is a modulo operation; and N is the number of redundant servers or routers/proxies. Accordingly, this formula is similar to the previous formula, except it adds a source port number and a protocol number to the formula. This formula can be used to distribute the load among the servers and/or routers/proxies.

Hereinafter, the term "network" refers to a connection between any two or more computational devices which permits the transmission of data. Hereinafter, the term "computational device" includes, but is not limited to, personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Micro sytems™; or any other known and available operating system, or any device, including but not limited to: laptops, hand-held computers, PDA (personal data assistant) devices, cellular telephones, any type of WAP (wireless application protocol) enabled device, wearable computers of any sort, which can be connected to a network as previously defined and which has an operating system. Hereinafter, the term "Windows™ "includes but is not limited to Windows95™, Windows 3.x™ in which "x" is an integer such as "1", Windows NT™, Windows98™, Windows CE™, Windows2000™, and any upgraded versions of these operating systems by Microsoft Corp. (USA).

The present invention can be implemented with a software application written in substantially any suitable programming language. The programming language chosen should be compatible with the computing platform according to which the software application is executed. Examples of suitable programming languages include, but are not limited to, C, C++ and Java.

In addition, the present invention may be embodied in a computer program product, as will now be explained.

On a practical level, the software that enables the computer system to perform the operations described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium. For the sake of simplicity, therefore, the term "program product" is thus used to refer to a computer useable medium, as defined above, which bears in any form of software to enable a computer system to operate according to the above-identified invention. Thus, the invention is also embodied in a program product bearing software which enables a computer to perform load balancing according to the invention.

In addition, the present invention can also be implemented as firmware or hardware. Hereinafter, the term "firmware" is defined as any combination of software and hardware, such as software instructions permanently burnt onto a ROM (read-only memory) device. As hardware, the present invention can be implemented as substantially any type of chip or other electronic device capable of performing the functions described herein.

In any case, the present invention can be described as a plurality of instructions being executed by a data processor, in which the data processor is understood to be implemented as software, hardware or firmware.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is directed to load balancing, based upon a calculation of a suitable distribution of the load among several servers. The present invention preferably does not require feedback from the servers. Also preferably, the present invention does not require the maintenance of a session table, such that the different sessions between the servers and clients need not be determined for the operation of the present invention.

The principles and operation according to the present invention are described below.

Figure 1:
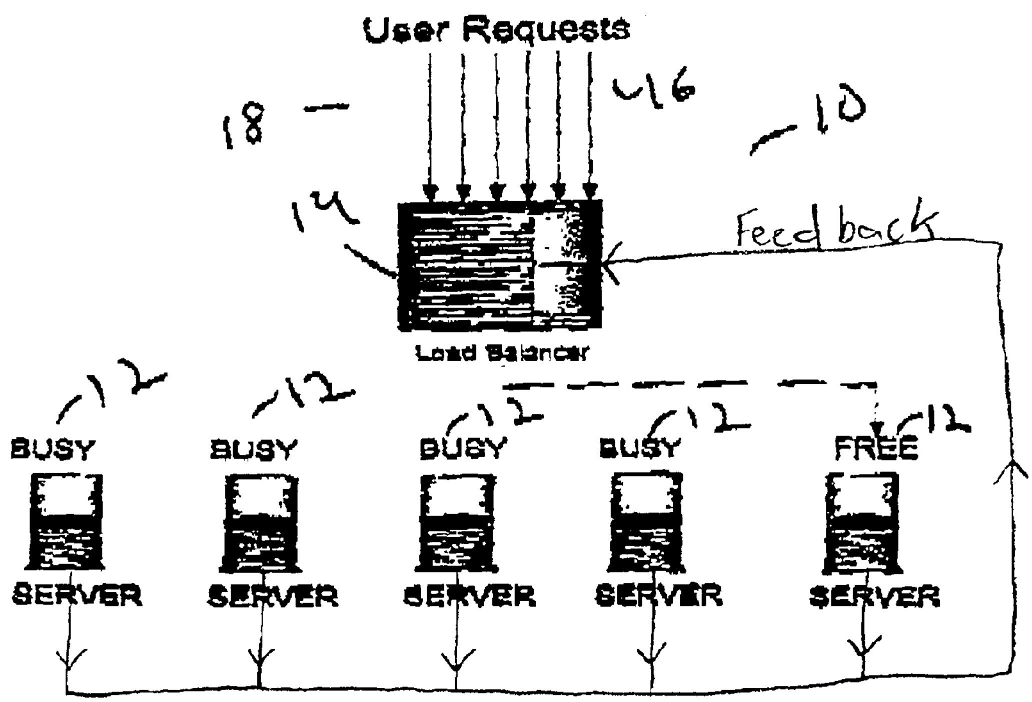
FIG. 1 is a block diagram showing a known system for load balancing.
Figure 2:
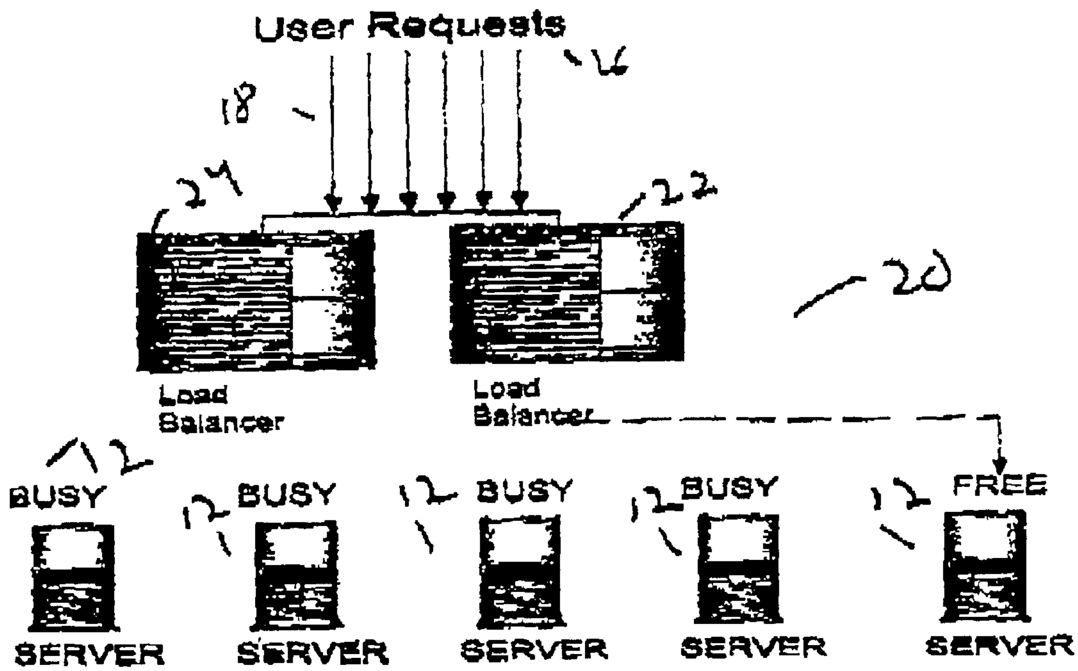
FIG. 2 is a block diagram of an exemplary system according to the present invention for load balancing.

FIG. 2 shows a system 20 according to the present invention for calculating load balancing. System 20 features a load balancer 22 (and optionally a second load balancer 24) according to the present invention, which as with the known load balancer 14 shown in FIG. 1 is in communication with several servers 12. Load balancer 22 is also a server which receives several user requests 16 from different clients across network 18.

However, unlike the known load balancer 14 shown in the system 10 of FIG. 1, load balancer 22 according to the present invention preferably does not receive any feedback from servers 12. In addition, load balancer 22 also preferably does not maintain a session table.

Instead, upon receipt and analysis of a packet, load balancer 22 performs a calculation in order to distribute the packet to a particular server 12. An example of a suitable formula for performing the calculation according to the present invention is given as follows:

((SRC_IP_ADDR+DEST_IP_ADDR+DEST_PORT) % N) Eq. 1 wherein SRC_IP_ADDR is the source IP address of the packet; DEST_IP_ADDR is the destination IP address of the packet; DEST_PORT is the port of the destination of the packet; % represents a modulo operation; and N is the number of redundant servers 12.

Another example of a suitable formula for performing the calculation according to the present invention is given as follows:

((SRC_IP_ADDR+SRC_PORT+DEST_IP_ADDR+DEST_PORT+PROTOCOL) % N) Eq. 2 wherein SRC_IP_ADDR is the source IP address of the packet; SRC_PORT is the source port number, DEST_IP_ADDR is the destination IP address of the packet; DEST_PORT is the port of the destination of the packet; PROTOCOL is the protocol number; % represents a modulo operation; and N is the number of redundant servers 12. Equation 2 differs from Equation 1 in that Equation 2 adds the source port number and the protocol number.

As is well known in the art, a packet is a bundle of data organized in a specific way for transmission. A packet consists of the data to be transmitted and certain control information, such as the source IP address, the destination IP address, and the destination port information. The source IP address, destination IP address and destination port can all be readily determined from the packet, as is well known in the art.

The %(modulo) represents an arithmetic operator, which calcuates the remainder of a first expression divided by a second expression. The formula according to equation 1 described above corresponds to the remainder of the sum of the source IP address, destination IP address and the destination port divided by the number of redundant servers.

The result of equation 1 will be the same for all packets of any particular session, and therefore load balancer 22 would not need to maintain a session table, in order to determine which server 12 should continue to receive packets from an already initiated session. That is, all packets from an already initiated session would necessarily be directed to the same server because all such packets Will cause the same result from equation 1. Furthermore, the vast number of IP addresses used in network 18 will necessarily cause the results of equation 1 to provide a statistically well balanced distribution of packets to the various servers 12. Therefore, optionally and preferably, no other load balancing mechanism is required.

Figure 3:
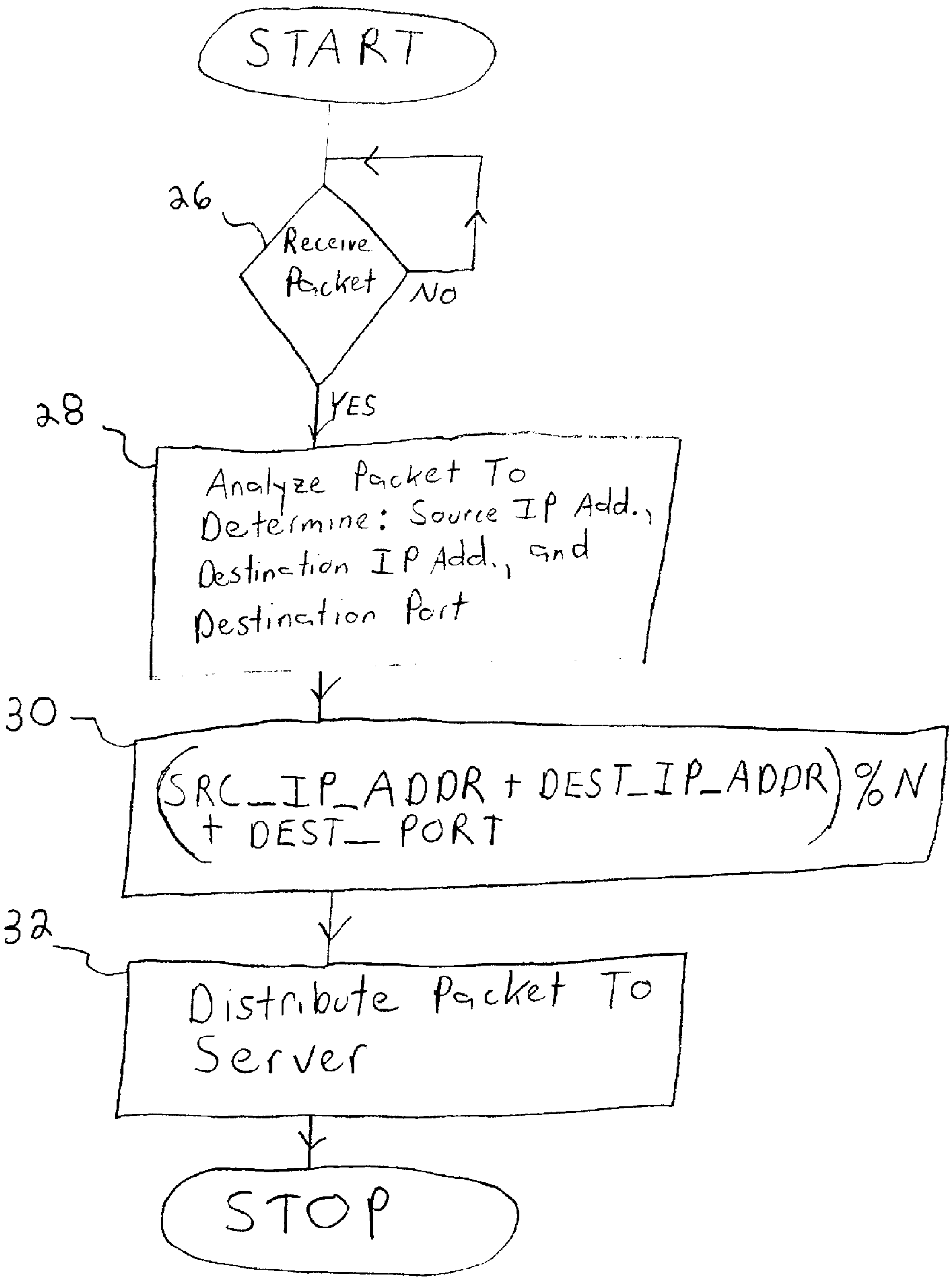
FIG. 3 is a flow chart describing the processing operations according to the present invention for load balancing.

FIG. 3 is a flow chart showing the operation of the load balancer 22 according to the present invention. In operation 26, the load balancer 22 receives a packet from the network. In operation 28, the load balancer 22 determines the source IP address of the received packet, the destination IP address of the packet, and the destination port of the packet. In operation 30, the calculation according to equation 1 is performed. That is, the remainder of the sum of the source IP address, the destination IP address and the destination port divided by the number N of servers is calculated. Finally, in operation 32, the packet is distributed to a particular server 12 in accordance with the calculation performed in operation 30. A similar program is used to perform the calculation according to formula (2). Referring to the flow chart of FIG. 3, in order to perform the formula (2) calculation, the packet analysis performed in operation 28 would also determine the source port number SRC_PORT as well as the protocol number PROTOCOL so that the calculation according to formula (2) is performed in operation 30.

Another advantage of the present invention is that a second load balancer 24 can optionally and preferably be included within system 20, as shown in FIG. 2. Second load balancer 24 can perform the same calculations as load balancer 22, without even necessarily communicating with load balancer 22. Therefore, if load balancer 22 becomes inoperative, second load balancer 24 could preferably receive all incoming packets and distribute them correctly according to the statistical calculation.

Thus, the present invention clearly has a number of advantages over the known system 10 shown in FIG. 1.

Figure 4:
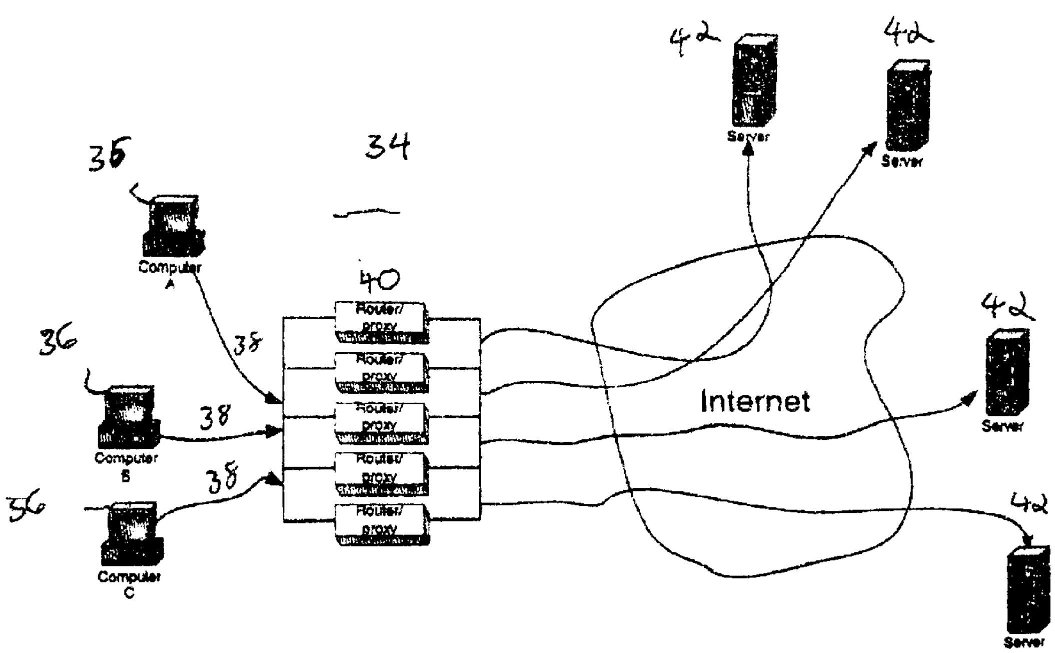
FIG. 4 is a block diagram showing another embodiment according to the invention for load balancing

FIG. 4 shows another embodiment of the invention in which a bank of router/proxy elements are load balanced according to the invention. As shown in FIG. 4, system 34 includes several computers 36, which provide various user requests (packets) 38 to a bank of router/proxy elements 40. Each of the router/proxy elements in bank 40 receives the same user request 38; however, only one of the router/proxy elements is selected to forward the received user request to a server 42 via the Internet.

According to the embodiment shown in FIG. 4, each of the router/proxy elements in bank 40 receives and analyzes the same packet in order to perform the calculation according to formula (1) or (2), with N being the number of redundant router/proxy elements. As a result of the calculation, one of the router/proxy elements is selected to handle the packet. Those router/proxy elements that are not selected, simply discard the packet. In this way, the load among the several router/proxy elements is distributed in much the same way that the load among the several servers was distributed in the previous embodiments.

The embodiments shown in FIGS. 2 and 4 can be combined to distribute the load among the several router/proxy elements as well as distribute the load among the several servers using, for example, formula (1) or (2).

In another embodiment according to the invention, the load balancer 22 (24) shown in FIG. 2 is eliminated, and instead the formula (1) or (2) for distributing the load among the several severs 12 is calculated in the servers themselves. That is, similar to the embodiment shown in FIG. 4 for distributing the load among the several router/proxy elements, each of the servers receives and analyzes the same packet. This can be accomplished by assigning the same MAC address to all of the servers. That is, by assigning the same MAC address to all of the servers, each packet will be provided to each of the servers. Each of the servers then performs the calculation according to formula (1) or (2) in order to select one of the servers to handle the packet. Those servers that are not selected, simply discard the packet. Accordingly, this embodiment distributes the load among the several servers in the same way as shown in FIG. 2, except the load balancer 22 is eliminated. Those skilled in the art will understand that certain applications of the invention may wish to include the load balancer 22 shown in in the FIG. 2 embodiment, whereas in other applications, it might be preferable to eliminate the load balancer 22 and perform the load balancing calculation within the servers themselves.

It will be appreciated that the above descriptions are intended only to serve as examples, and that many other embodiments are possible within the spirit and the scope of the present invention.

What is claimed is:

1. A system for distributing a packet received over a network, the system comprising:

(a) a plurality of servers connected to the network; and (b) a load balancer, connected to the network, for selecting one of the plurality of servers according to a calculation, wherein said calculation is performed according to the formula:

((SRC_IP_ADDR+DEST_IP_ADDR+DEST_PORT) % N)

wherein SRC_IP_ADDR is the source IP address of the packet; DEST_IP_ADDR is the destination IP address of the packet; DEST_PORT is the Port of the destination of the packet; % is a modulo operation; and N is the number of servers.

2. The system of claim 1, wherein said calculation is determined such that each packet from a particular session is sent to the same server.

3. The system of claim 2, wherein said load balancer does not maintain a session table.

4. The system claim 1, wherein said calculation is independent of any feedback from the plurality of servers.

5. The system claim 4, wherein said load balancer does not receive feedback from said plurality of servers.

6. The system of claim 1, wherein said calculation is based on data associated with the packet.

7. The system of claim 6, wherein said data is invariant from packet to packet within a session.

8. The system of claim 6, wherein at least a portion of the data is associated with a source of the packet.

9. The system of claim 6, wherein at least a portion of the data is associated with a destination of the packet.

10. The system of claim 6, wherein at least a portion of the data is associated with a destination port of the packet.

11. The system of claim 6, wherein at least a portion of the data is associated with a source port of the packet.

12. The system of claim 6, wherein at least a portion of the data is associated with a protocol number of the packet.

13. The system of claim 1, wherein said plurality of servers are redundant servers.

14. The system of claim 1, wherein said load balancer is termed a first load balancer, and further comprising a second load balancer, connected to the network, for selecting, according to the formula, one of the plurality of servers for receiving another packet received over the network.

15. The system according to claim 14, wherein said second load balancer is operable only if said first load balancer is inoperable.

16. The method of claim 1, wherein said calculation is based on data associated with the packet.

17. The method of claim 16, wherein said data is invariant from packet to packet within a session.

18. The method of claim 16, wherein at least a portion of the data is associated with a source of the packet.

19. The method of claim 16, wherein at least a portion of the data is associated with a destination of the packet.

20. The method of claim 16, wherein at least a portion of the data is associated with a destination port of the packet.

21. The method of claim 16, wherein at least a portion of the data is associated with a source port of the packet.

22. The method of claim 16, wherein at least a portion of the data is associated with a protocol number of the packet.

23. The system of claim 1, further comprising a plurality of routers/proxies, each of said routers/proxies receiving the packet, and each of said router/proxies performing a calculation for selecting one of the routers/proxies for handling the packet.

24. A system of claim 23, wherein each of the routers/proxies performs the calculation based on data associated with the packet.

25. A system for distributing a packet received over a network, the system comprising:

(a) a plurality of servers connected to the network; and (b) a load balancer, connected to the network, for selecting one of the plurality of servers according to a calculation, wherein said calculation is performed according to the formula:

((SRC_IP_ADDR+SRC_PORT+DEST_IP_ADDR+DEST_PORT+PROTOCOL) % N)

wherein SRC_IP_ADDR is the source IP address of the packet; SRC PORT is the source port number of the packet, DEST_IP_ADDR is the destination IP address of the packet; DEST_PORT is the port of the destination of the packet; PROTOCOL is the protocol number of the packet, % is a modulo operation; and N is the number of servers.

26. A method for load balancing a plurality of servers, comprising:

(a) receiving a packet;

(b) determining a source IP address of said packet, a destination IP address of said packet and a port of the destination of said packet;

(c) identifying one of the plurality of servers according to a calculation, wherein the calculation is performed according to the following formula:

((SRC_IP_ADDR+DES_IP_ADDR+DEST_PORT) % N)

wherein SRC_IP_ADDR is the source IP address of the packet; DEST_IP_ADDR is the destination IP address of the packet; DEST_PORT is the port of the destination of the packet; % is a modulo operator; and N is the number of servers; and further comprising:

(d) distributing said packet to the identified one of said plurality of servers.

27. A method for load balancing a plurality of servers, comprising:

(a) receiving a packet;

(b) determining a source IP address of said packet, a destination IP address of said packet and a port of the destination of said packet;

(c) identifying one of the plurality of servers according to a calculation, wherein the formula is calculated according to the formula ((SRC_IP_ADDR+SRC_PORT+DEST_IP_ADDR+DEST_PORT+PROTOCOL) % N)

wherein SRC_IP_ADDR is the source IP address of the packet; SRC_PORT is the source port number of the packet; DEST_IP_ADDR is the destination IP address of the packet; DEST_PORT is the port of the destination of the packet; PROTOCOL is the protocol number; % is a modulo operator; and N is the umber of servers; and further comprising:

(d) distributing said packet to the identified one of said plurality of servers.

28. A method for load balancing a plurality of servers, comprising:

(a) receiving a packet;

distributing the received packet to a particular one of the plurality of servers according to a calculation, wherein said calculation is based on data associated with the packet, and wherein each of said plurality of servers performs the calculation based on data associated with the packet, wherein the calculation is performed according to the formula: ((SRC_IP_ADDR+DES_IP_ADDR+DEST_PORT) % N)

wherein SRC_IP_ADDR is the source IP address of the packet; DEST_IP_ADDR is the destination IP address of the packet ; DEST_PORT is the port of the destination of the packet; % is a modulo operator; and N is the umber of servers.

29. The method of claim 28, wherein the calculation is performed independently of any feedback from said servers.

30. A computer program product for enabling a computer to load balance a plurality of servers, the computer program comprising: software instructions for enabling the computer to perform predetermined operations, and a computer readable medium bearing the software instructions;

the predetermined operations including:

(a) receiving a packet;

(b) determining packet information including a source IP address of the packet, a destination IP address of the packet and a port of the destination of the packet; and (c) selecting a particular server from the plurality of servers for receiving a particular packet according to a calculation based on the packet information, wherein the calculation is performed according to the formula:

((SRC_IP_ADDR+DEST_IP_ADDR+DEST_PORT) % N)

wherein SRC_IP_ADDR is the source IP address of the packet; DEST_IP_ADDR is the destination IP address of the packet; DEST_PORT is the port of the destination of the packet; % is a modulo operator; and N is the number of servers.

31. The computer program product of claim 30, wherein the calculation is based on data associated with the packet.

32. A system of distributing a packet over a network, comprising:

a plurality of routers/proxie, each of said routers/proxies receiving the packet, and each of said router/proxies performing a calculation for selecting one of the routers/proxies for handling the packet, wherein the calculation is performed according to the following formula:

((SRC_IP_ADDR+DEST_IP_ADDR+DEST_PORT) % N)

wherein SRC_IP_ADDR is he source IP address of the packet; DEST_IP_ADDR is the destination IP address of the packet; DEST_PORT is the port of the destination of the packet; % is a modulo operator; and N is the number of routers/proxies.

33. The system of claim 32, wherein the calculation is based on data associated with the data.

34. The system of claim 33, wherein the data is invarient from packet to packet within a session.

35. The system of claim 33, wherein at least a portion of the data is associated with a source of the packet.

36. The system of claim 33, wherein at least a portion of the data is associated with a destination of the packet.

37. The system of claim 33, wherein at least a portion of the data is associated with a source port number of the packet.

38. The method of claim 33, wherein at least a portion of the data is associated with a protocol number of the packet.

39. A system of distributing a packet over a network, comprising:

a plurality of servers, each said servers receiving the packet, and each of said servers performing a calculation for selecting one of the routers/proxies for handling the packet, wherein the calculation is performed according to the following formula:

((SRC_IP_ADDR+DEST_IP_ADDR+DEST_PORT) % N)

wherein SRC_IP_ADDR is he source IP address of the packet; DEST_IP_ADDR is the destination IP address of the packet; DEST_PORT is the port of the destina tion of the packet; % is a modulo operator; and N is the number of servers.

40. The system of claim 39, wherein the calculation is based on data associated with the packet.

41. The system of claim 39, further comprising a plurality of routers/proxies, each of said routers/proxies receiving the packet, and each of said router/proxies performing a calculation for selecting one of the routers/proxies for handling the packet.

42. The system of claim 41, wherein the calculation by each of the router/proxies is based a data associated with the packet.

* * * * *